United States Patent Office 2,855,409
Patented Oct. 7, 1958

2,855,409

SUBSTITUTED BENZANTHRONES AND PROCESSES OF MAKING SAME

David I. Randall, New Vernon, N. J., assignor to General Aniline & Film Corporation, New York, N. Y., a corporation of Delaware No Drawing. Application December 22, 1955
Serial No. 554,623

5 Claims. (Cl. 260—364)

This invention relates to new and useful benzanthrone derivatives and to processes for making same, and in particular to 3-chloro-9-(dichloromethyl)benzanthrone and the hydrolysis product thereof, namely, 3-chloro-9-benzanthrone aldehyde.

Aldehydes of the benzanthrone class are extremely difficult to prepare. Thus, 3-benzanthrone aldehyde is known and has been prepared by the selenium oxide oxidation of 3-methyl-benzanthrone. The yields, however, are very poor and the utility of little value. On the other hand, the particular aldehyde derivative of this invention not only is readily prepared in excellent yields from an intermediate which is also the subject of this invention, which intermediate is also obtainable in excellent yields from known compounds but the 3-chloro-9-benzanthrone aldehyde of this invention is a very valuable product for the preparation of various other compounds and in particular derivatives of the azo methine type and of the violanthrone and isoviolanthrone types.

It is therefore an object of this invention to provide 3-chloro-9-(dichloromethyl)benzanthrone which has the formula:

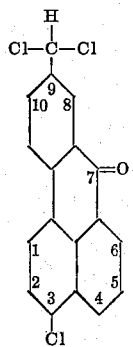

I and process for making same.

It is a further object of this invention to provide 3-chloro-9-benzanthrone aldehyde having the formula:

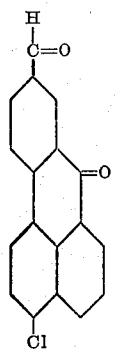

II and processes for preparing same.

Other objects will appear hereinafter as the description proceeds.

As described above, 3-benzanthrone aldehyde, a known compound, while conceivably possessed of some utility, is of no value in the preparation of condensation products of the violanthrone and isoviolanthrone types. Additionally, as mentioned above, it is not economically feasible to prepare this known aldehyde in view of the low yields. I have discovered, on the other hand, that 3-chloro-9-benzanthrone aldehyde can be readily prepared in practically quantitative yields by the hydrolysis of 3-chloro-9-(dichloromethyl)benzanthrone. The latter compound is also readily prepared by the chlorination of 3-halo-9-chloromethyl benzanthrones as described in U. S. Patent 2,531,465. It was completely unexpected that 3-chloro-9-(dichloromethyl) benzanthrone could be obtained in an excellent state of purity and in high yields from the compounds in the aforementioned U. S. patent through the simple expedient of chlorination.

The general process of this invention involves chlorinating the 3-halo-9-chloromethyl benzanthrones dissolved preferably in a suitable solvent and again preferably at an elevated temperature. Among the solvents which may be employed are chloroform, carbon tetrachloride, ethylene dichloride, ethylene dibromide, chlorobenzene, orthodichlorobenzene and the like. The temperature of chlorination may be varied between about 125° C. to about 250° C. but it is preferred to employ temperatures in the range of about 150 to 180° C. As a result of the direct chlorination of the 3-halo-9-chloromethyl benzanthrones, there is obtained on cooling a crystalline product of 3-chloro-9-(dichloromethyl)benzanthrone. The subsequent hydrolysis of 3-chloro-9-(dichloromethyl)benzanthrone to 3-chloro-9-benzanthrone aldehyde may be carried out in concentrated sulfuric acid and again it is preferred to employ a slightly elevated temperature to expedite this conversion. Temperatures in the range of about 50 to 100° C, and preferably 60 to 75° C. are employed. In the following examples which will serve to illustrate the present invention without being deemed limitative thereof, parts and percentages are by weight unless otherwise indicated.

EXAMPLE 1

Twenty parts of 3-bromo-9-chloromethyl benzanthrone are dissolved in 120 parts o-dichlorobenzene. At a temperature of 170–175° C. chlorine is passed into the solution for a period of 3 hours. Bromine and hydrochloric acid gas are evolved. On cooling to 70° C., the crystalline magma is thinned with 40 parts chlorobenzene and filtered at 30° C. After washing with ethanol and drying, a weight of 12.5 parts is obtained. The melting point is 208–211° C. Chlorine calc. 32.2%, found 32.9%.

EXAMPLE 2

30 grams of 3-chloro-9-chloromethyl benzanthrone are dissolved in 200 grams of ethylene dichloride. The temperature of the solution is raised to 160° C. and chlorine gas is then passed into the solution for a period of 2 hours. The solution is then cooled to 30° C. and allowed to stand for about 5 minutes. A copious crystalline precipitate results. The mass is filtered and the solid crystals are washed with ethanol and then dried. The resulting product has a melting point of 210 to 212° C. and a weight of 21 g.

EXAMPLE 3

*Hydrolysis to aldehyde*

9 parts of the compound prepared in Example 1 is dissolved in 182 parts of 96% sulfuric acid. Evolution of hydrogen chloride begins immediately. The resultant solution is then warmed at 70° C. for 2 hours after which the entire mass is drowned in 1 liter of cold water. A crystalline product results. This product is then filtered, washed with water until no residual acid is present, and then dried. 7 parts of product are obtained. Chlorine content found, 13.2%. Chlorine content calculated, 3-chloro aldehyde, 12.1%.

3-chloro-9-benzanthrone aldehyde may be employed in a variety of reactions to prepare valuable dyestuffs. Thus, with 1-amino-anthraquinone a practically quantitative yield of a condensation product is obtained which product gives excellent and pleasing yellow shades of good fastness properties on cotton goods in spite of the large molecular weight and the presence in the molecule of only one vattable residue. 3-chloro-9-benzanthrone aldehyde may also be condensed with 2 moles of 1-amino anthraquinone and upon subsequent fusion with caustic results in an azo methine dyestuff containing an acridine moiety.

I claim:

1. 3-chloro-9-benzanthrone aldehyde.

2. A process for preparing 3-chloro-9-benzanthrone aldehyde which comprises hydrolyzing 3-chloro-9-(dichloromethyl)benzanthrone in an acid medium and isolating the resultant product.

3. A process for preparing 3-chloro-9-benzanthrone aldehyde which comprises chlorinating a 3-halo-9-chloromethyl benzanthrone wherein the 3-halo substituent is a member of the group consisting of chlorine and bromine and subjecting the resultant 3-chloro-9-(dichloromethyl) benzanthrone to acid hydrolysis.

4. A process for preparing 3-chloro-9-benzanthrone aldehyde which comprises chlorinating 3-bromo-9-chloromethyl benzanthrone dissolved in a solvent at a temperature of about 170 to 175° C., isolating 3-chloro-9-(dichloromethyl) benzanthrone and subjecting the latter to hydrolysis in concentrated sulfuric acid whereby 3-chloro-9-benzanthrone aldehyde is produced.

5. A process for preparing 3-chloro-9-benzanthrone aldehyde which comprises chlorinating a 3-halo-9-chloromethyl benzanthrone wherein the 3-halo substituent is a member of the group consisting of chlorine and bromine at a temperature from about 125° C. to about 250° C. and subjecting the resultant 3-chloro-9-(dichloromethyl) benzanthrone to acid hydrolysis.

References Cited in the file of this patent

UNITED STATES PATENTS

| | | |
|---|---|---|
| 2,034,629 | Moser et al. | Mar. 17, 1936 |
| 2,531,465 | Randall et al. | Nov. 28, 1950 |
| 2,563,663 | Sievenpiper | Aug. 7, 1951 |

OTHER REFERENCES

Angewandte Chemie-Gerhard Stein, 1941, pg. 146, "Neuere Methoden der praparatinen organischen Chemie."

Beilstein, 1948, vol. 7, second supplement, pg. 477.

Noller: Chemistry of Organic Componds, 1951 (pg. 193).